United States Patent [19]
Takeda

[11] Patent Number: 5,102,244
[45] Date of Patent: Apr. 7, 1992

[54] CHARACTER PATTERN GENERATING APPARATUS FOR USE IN A DOT MATRIX SERIAL TYPE PRINTER

[75] Inventor: Hiroshi Takeda, Suwa, Japan

[73] Assignee: Seiko Epson Corporation, Tokyo, Japan

[21] Appl. No.: 366,008

[22] Filed: Jun. 14, 1989

Related U.S. Application Data

[63] Continuation-in-part of Ser. No. 135,484, Dec. 21, 1987, abandoned, which is a continuation of Ser. No. 826,528, Feb. 6, 1986, abandoned.

[30] Foreign Application Priority Data

Feb. 8, 1985 [JP] Japan .................................. 60-22915

[51] Int. Cl.[5] .............................................. B41J 2/51
[52] U.S. Cl. ................................................... 400/121
[58] Field of Search ......................................... 400/121

[56] References Cited

U.S. PATENT DOCUMENTS

| | | | |
|---|---|---|---|
| 4,059,183 | 11/1977 | Hoskins | 101/93.05 |
| 4,201,488 | 5/1980 | Gossett et al. | 400/124 |
| 4,511,267 | 4/1985 | Pokorny | 400/121 |
| 4,683,818 | 8/1987 | Hewlett | 400/121 |
| 4,707,153 | 11/1987 | Nishi | 400/121 |

Primary Examiner—David A. Wiecking
Assistant Examiner—Steven S. Kelley
Attorney, Agent, or Firm—Blum Kaplan

[57] ABSTRACT

A character pattern generating apparatus for use in a dot matrix type serial printer. The apparatus includes a character pattern storage apparatus for storing dot pattern data representative of characters corresponding to print codes. A buffer memory, coupled to the character pattern storage apparatus receives dot pattern data corresponding to selected print codes read out from the character pattern storage apparatus representative of at least one character. A font type adjustment apparatus, coupled to the buffer memory, changes the font type of a character output from the character pattern storage means to the buffer memory from a first font type, stored in the character pattern storage apparatus, to a second font type. A line memory stores dot pattern data for a line to be printed. A print head adjustment apparatus, coupled between the buffer memory and the line memory, outputs the dot pattern data stored in the buffer memory to the line memory in the order in which it is to be printed.

20 Claims, 8 Drawing Sheets

CHARACTER PATTERN GENERATING APPARATUS FOR USE IN A DOT MATRIX SERIAL TYPE PRINTER

CROSS REFERENCE TO RELATED APPLICATIONS

This is a Continuation-In-Part of U.S. patent application Ser. No. 07/135,484 filed Dec. 21, 1987 now abandoned which is a File Wrapper Continuation of U.S. application Ser. No. 06/826,528 filed on Feb. 6, 1986 now abandoned.

BACKGROUND OF THE INVENTION

The invention is directed to a character pattern generating apparatus and in particular to a character pattern generating apparatus suitable for use in a dot matrix printer capable of generating characters on serial printers with print heads having different print patterns.

Dot matrix type serial printers are easily adapted to print characters, figures and the like with a plurality of dot patterns. Due to the great degree of flexibility inherent in dot matrix type serial printers in expressing a wide variety of dot patterns, dot matrix type serial printers are widely used as printing output devices for word processors and computers.

In order to fully utilize the capabilities of the serial dot matrix printers, it is necessary to prepare and store pattern data which corresponds to the character patterns which are to be printed. This need to store each character as a preformed matrix of dots typically requires the character generator to have a particularly large capacity which is disadvantageous.

As the resolution of the printed dots is increased to provide sharper and clearer printing of letters and graphics displays, print heads frequently utilized print head arrangements with complimentary columns of pins P as shown in FIGS. 2A and 2B. Print heads with these staggered columns of pins produce a single column of overlapping dots D as shown in FIG. 2C by sequential printing of the columns of pins P on the same column on a paper. The pin alignment of the print head of FIG. 2A utilizes a first printing operation of the right column of pins. Next, when the print head is moved right relative to the paper or other printing medium, the left column is printed in the same column. This produces a column of overlapping dots as shown in FIG. 2C. A three column print head a shown in FIG. 2B requires three printing operations to produce the single column of overlapping dots shown in FIG. 2C. As a result of these varied print arrangements, it has been necessary to also take into consideration the pin arrangement of the printer when storing the dot pattern data. As a result, this requires considerable time in forming the pattern data. It also has the disadvantage of seriously limiting the application of a character generator to a particular print head with a particular pin arrangement. Accordingly, there is a need for a character pattern generating apparatus which can easily be utilized with different printers having different print head pin arrangements and for different font types without the need for a large capacity character generator or time consuming processing operation.

SUMMARY OF THE INVENTION

The invention is generally directed to a character pattern generating apparatus for use with a dot matrix type serial printer. The character pattern generating apparatus includes a character pattern storage device for storing character dot pattern data representative of characters corresponding to print codes. A buffer memory, coupled to the character pattern storage device for receiving dot pattern data corresponding to selected print codes read out from the character pattern storage device and storing the dot pattern data representative of at least one character. A font type adjustment apparatus, operated by a CPU, coupled to the buffer memory changes the font type of a character output from the character pattern storage device to a second font type. A line memory stores dot patterns for a line to be printed. A print head adjustment device, operated by the CPU, which is coupled between the buffer memory and the line memory outputs the dot pattern data stored in the buffer memory in the order in which it is to be printed.

An object of the invention is to provide an improved character pattern generating apparatus for a dot matrix type serial printer.

Another object of the invention is to provide an improved character pattern generating apparatus for a dot matrix type serial printer which is capable of generating a wide variety of character dot pattern data with a small capacity character generator.

A further object of the invention is to provide a character pattern generating apparatus which has a buffer memory for temporarily storing the dot pattern data read out from the character generator, in which the modification of character pattern data may be processed to provide a rearranged dot pattern representative of the desired type font.

Yet another object of the invention is to provide a character pattern generating apparatus to be used with a variety of dot matrix type serial printers with different print heads.

Still another object of the invention is to provide a character pattern generating apparatus which has a buffer memory for temporarily storing the dot pattern data read out from the character generator and a line memory for storing the printout data for the pins of a utilized print head in the proper order.

Yet a further object of the invention is to provide a character pattern generating apparatus capable of high speed processing wherein the data stored in the line memory is transmitted to the print head without the need for the CPU to continuously control printing, the CPU processing the character or print code from the host device in accordance with the applied character modification instruction referencing the character generator and storing it in the line memory.

Still other objects and advantages of the invention will in part be obvious and will in part be apparent from the specification.

The invention accordingly comprises the features of construction, combination of elements, and arrangement of parts which will be exemplified in the construction hereinafter set forth and the scope of the invention will be indicated in the claims.

BRIEF DESCRIPTION OF THE DRAWINGS

For a fuller understanding of the invention, reference is had to the following description taken in connection with the accompanying drawings, in which:

FIGS. 4A and 4B depict the arrangement of the print data corresponding to the pattern in FIG. 3 as it is stored in a character generator constructed in accordance with a preferred embodiment of the invention;

FIG. 5 shows the dot pattern data representing a pattern changed from the dot pattern data in FIG. 4 to a double-width character and stored in a buffer storage constructed in accordance with the preferred embodiment of the invention;

FIG. 6 is the pattern data of FIG. 5 stored in a line memory constructed in accordance with a preferred embodiment of the invention which is rearranged corresponding to the pin arrangement of the print head of FIG. 2A;

FIG. 9 the diagram of the character pattern after it has been changed to talic form.

DETAILED DESCRIPTION OF THE PREFERRED EMBODIMENTS

Figure 1:
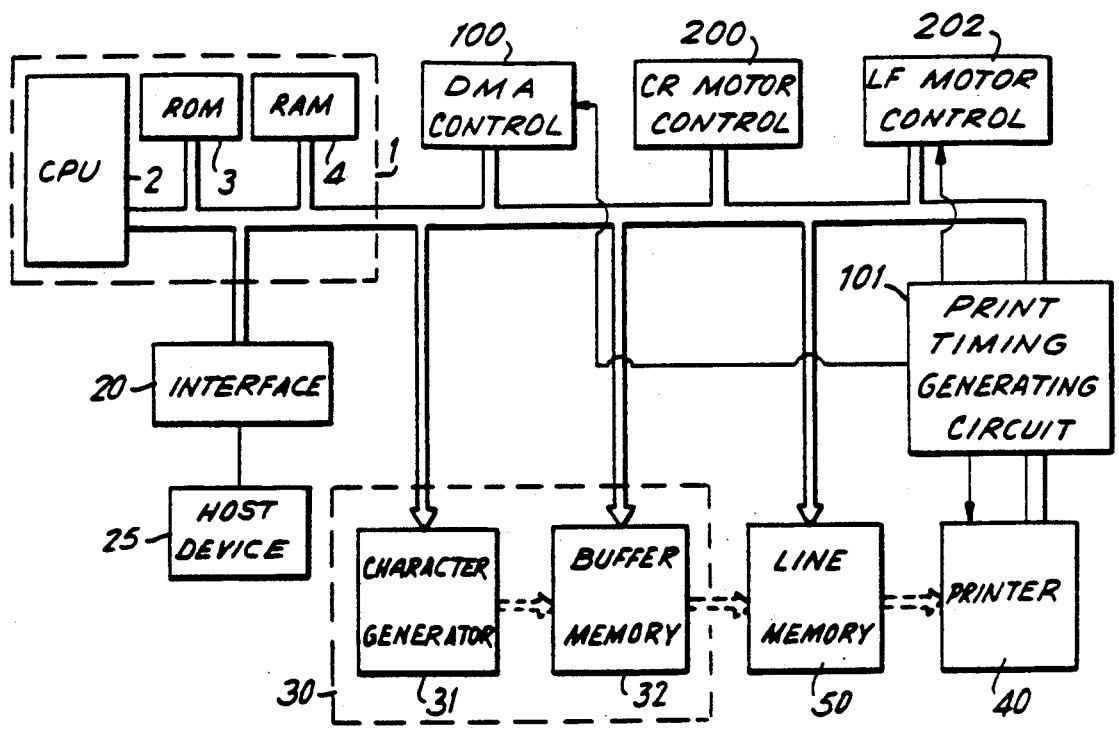
FIG. 1 is a block diagram of a character pattern generating apparatus constructed in accordance with a preferred embodiment of the invention.

Reference is made to FIG. 1 wherein a microprocessor portion 1, host device 25, interface 20, character pattern generating apparatus 30 constructed in accordance with a preferred embodiment of the invention, line memory 50 and printer 40 are depicted. Microprocessor portion 1 includes a CPU 2, ROM 3 and RAM 4. Microprocessor portion 1 is designed to monitor the transfer of print data or control codes representing the initiation of printing the setting of paper feed length, or the designation of the character modification which is input from host device 25 through interface 20. At the same time, microprocessor portion 1 also actuates character pattern generating apparatus 3 in accordance with the contents of the print data received from host device 25.

Character pattern generating apparatus 30, constructed in accordance with the invention, includes a character generator 31 which stores basic dot pattern data corresponding to character or print codes and a buffer memory 32 which has a memory capacity of more than one character in which dot pattern data read out from character generator 31 is temporarily stored. The memory capacity for a character changes when a character is modified so that the character pattern capacity is more than double the character when it is enlarged in the horizontal direction. The print or character codes are standardized codes for letters or characters (e.g. ASCII), sent from host device 25 and correspond to letters or symbols. If necessary, the arrangement of a stored pattern is modified through dot pattern correction on the basis of character modification instruction data and the processed pattern is output to line memory 50 in such a manner as to correspond to the arrangement of printing pins on a print head in printer 40. The character modification instruction data is stored in ROM 3 of microprocessor 1. The modification is controlled by CPU 2 which alters and restores the character pattern in buffer memory 32.

Line memory 50 has a memory capacity corresponding to a at least a printed line of printer 40. The pattern to be printed is stored in accordance with the pin arrangement so that continuous printing in the desired direction is implemented. The dot pattern data is output under the timing control of a print timing signal. The print timing signal is produced by a print timing generating circuit (FIG. 7) and is a clocked signal. Further, data is transmitted from line buffer memory 50 to pin data buffer 102 by DMA controller 100, which is operated independently of CPU 2.

The carriage is mounted to a printing head is moved in a direction along the printing column by a CR Motor. The CR Motor is driven by a CR Motor Control 200. The carriage return moves in a horizontal direction perpendicular to the feed direction of the recording paper. Paper feeding is controlled by an LF Motor. LF Motor is driven by an LF Motor Control 202. Both the CR Motor Control 200 and the LF Motor Control 202 are controlled by the Print timing generating circuit 101.

Figure 8A:
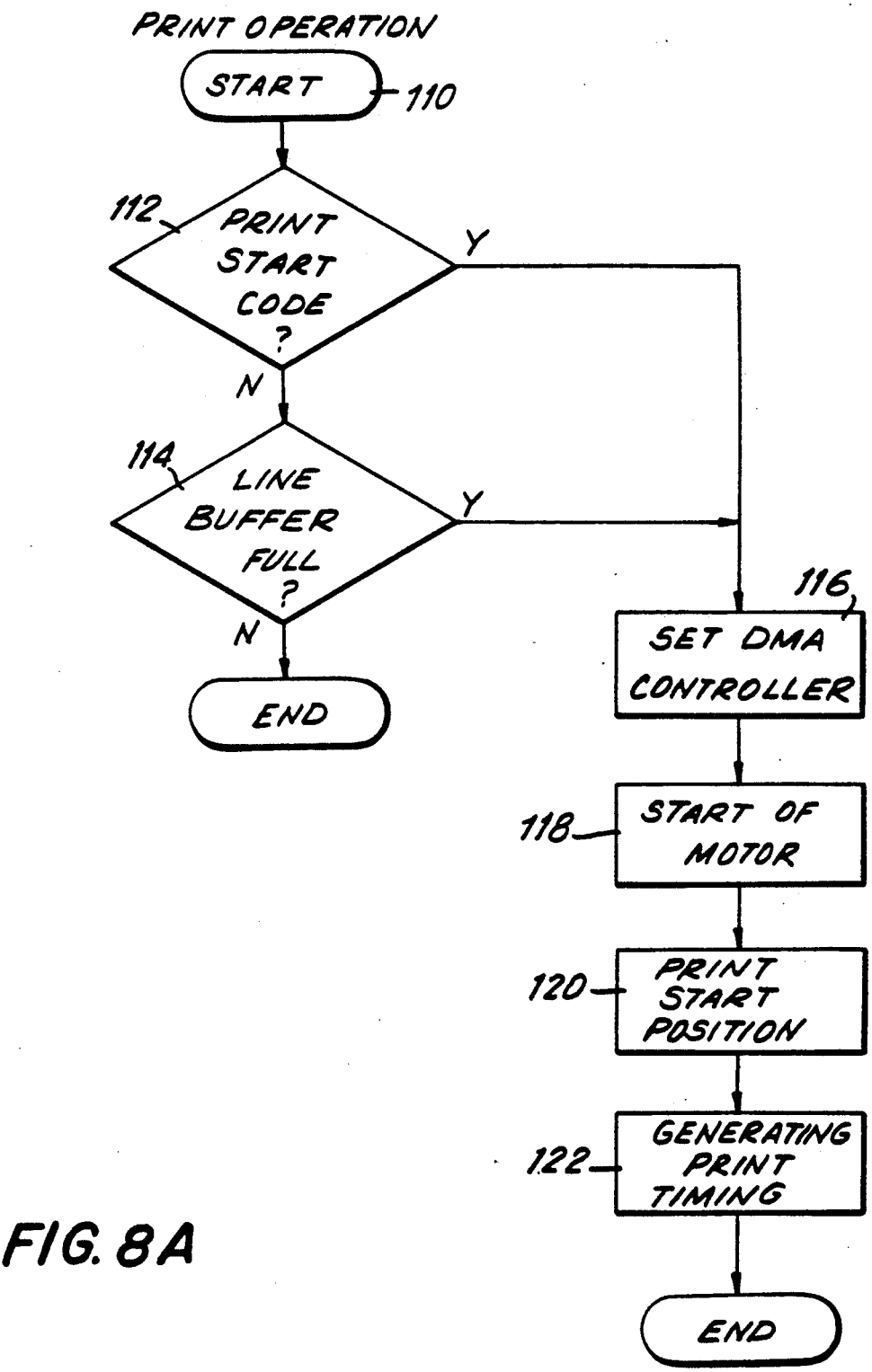
FIG. 8A and 8B are flow charts for operation of the DMA control in accordance with the invention.
Figure 8B:
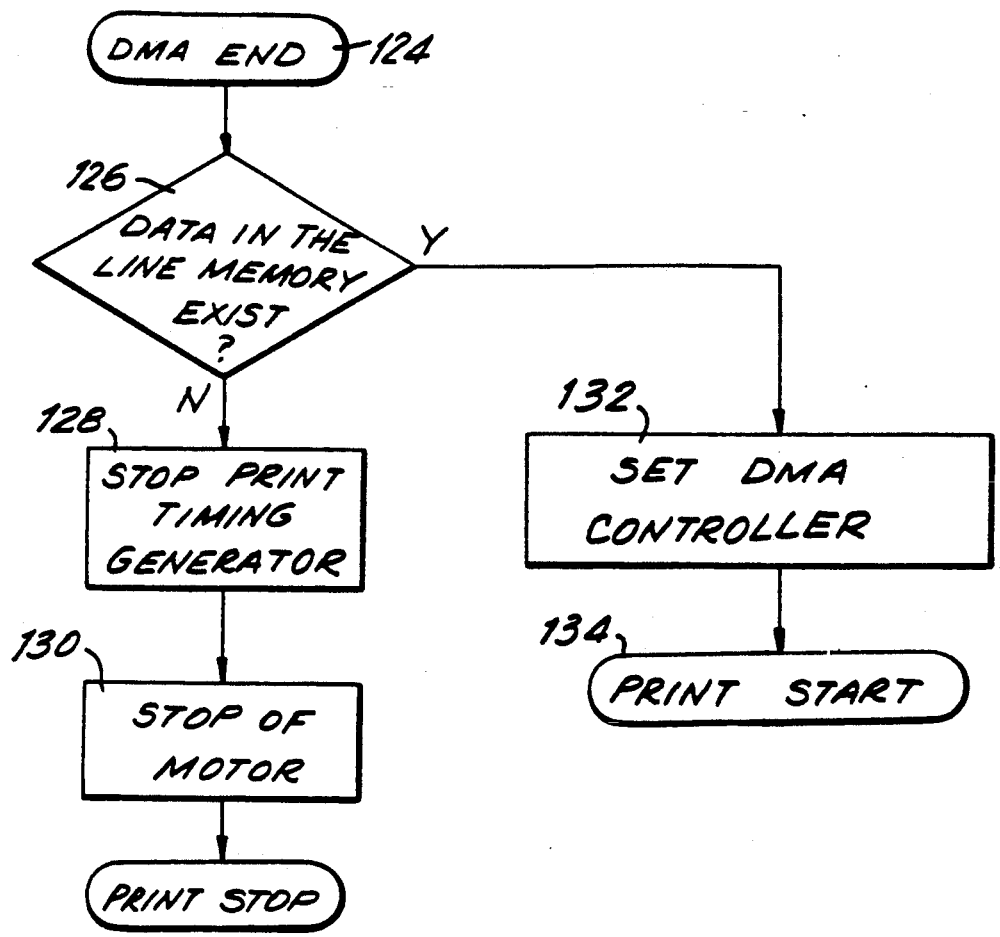

Reference is now made to FIG. 8a wherein the independent operation of memory buffers 50, 102 is provided. Printing begins in accordance with a step 110. If either a print start code is provided in accordance with 112, or it is determined that line buffer memory 50 is filled with a dot pattern corresponding to an entire line, in accordance with a step 114, CPU 2 sets the start address of the DMA controller and the amount of data transmitted by the DMA controller in a step 116 and controls the CR motor control circuit 200 to begin driving of the print motor in a step 118. The carriage which is driven by the CR motor moves to a suitable position to begin printing in a step 120. CPU 2 controls the print timing generator to output a timing pulse at a desired frequency in a step 122. Printing then continues independent of control CPU until the amount of data previously set by the DMA control circuit 100 is complete. Upon the completion of the transmitting of this data, DMA controller 100 causes an interrupt. DMA control circuit 100 now requires processing control from CPU 2. CPU 2 confirms the completion of the transmission of data by checking the condition of DMA control circuit 100. CPU 2 controls the print timing generator to stop the output of the timing pulse and controls the CR motor control circuit 200 so as to stop motor driving in a step 130. If data still does exist in line memory 50, then the DMA controller 100 is reset in a step 132 and printing is begun again in a step 134.

Although a two print line memory capacity is desirable, a memory capacity corresponding to a single print line is sufficient. Further, a single print line or less memory capacity is sufficient. This small capacity may be utilized where the data to be printed is successively written in a region of the line memory which has just completed DMA transmitting. DMA control circuit 100 is stopped for a short time which does not effect printing to renew the data to be transmitted by DMA control circuit 100. DMA control circuit 100 then becomes enabled again to control transmission of data. Furthermore, in the case of discontinuous addresses of line memory, the data being transmitted is brought to an end and a new start address for DMA transmission and the amount of data to be transmitted by DMA 100 are reset without stopping CR motor or the print timing generator.

By utilizing the above described control methods, printing may be carried without utilizing the CPU during the printing operation. Accordingly, the CPU is free to conduct other operations during printing.

Dot pattern correction, accomplished between buffer memory 32 and microprocessor 1, corrects the dot pattern data read out from the character generator 31 in at least one of two different ways. By way of example, the first manner in which dot pattern correction occurs is by changing the dot pattern data representative of at least one character from a first font type to a second font type.

When microprocessor portion 1 receives print data transferred from host device 25, microprocessor portion 1 accesses, with a character code corresponding to the received print data, character generator 31, and causes character generator 31 to read out the corresponding dot pattern data to buffer memory 32. Then, if the required character has a font type identical to that of the basic character pattern stored in character generator 31, microprocessor portion 1 outputs the dot pattern data, temporarily stored in buffer memory 32, to line memory 50 in accordance with the printing order called for by the pin arrangement of the print head in printer 40.

Figure 9:
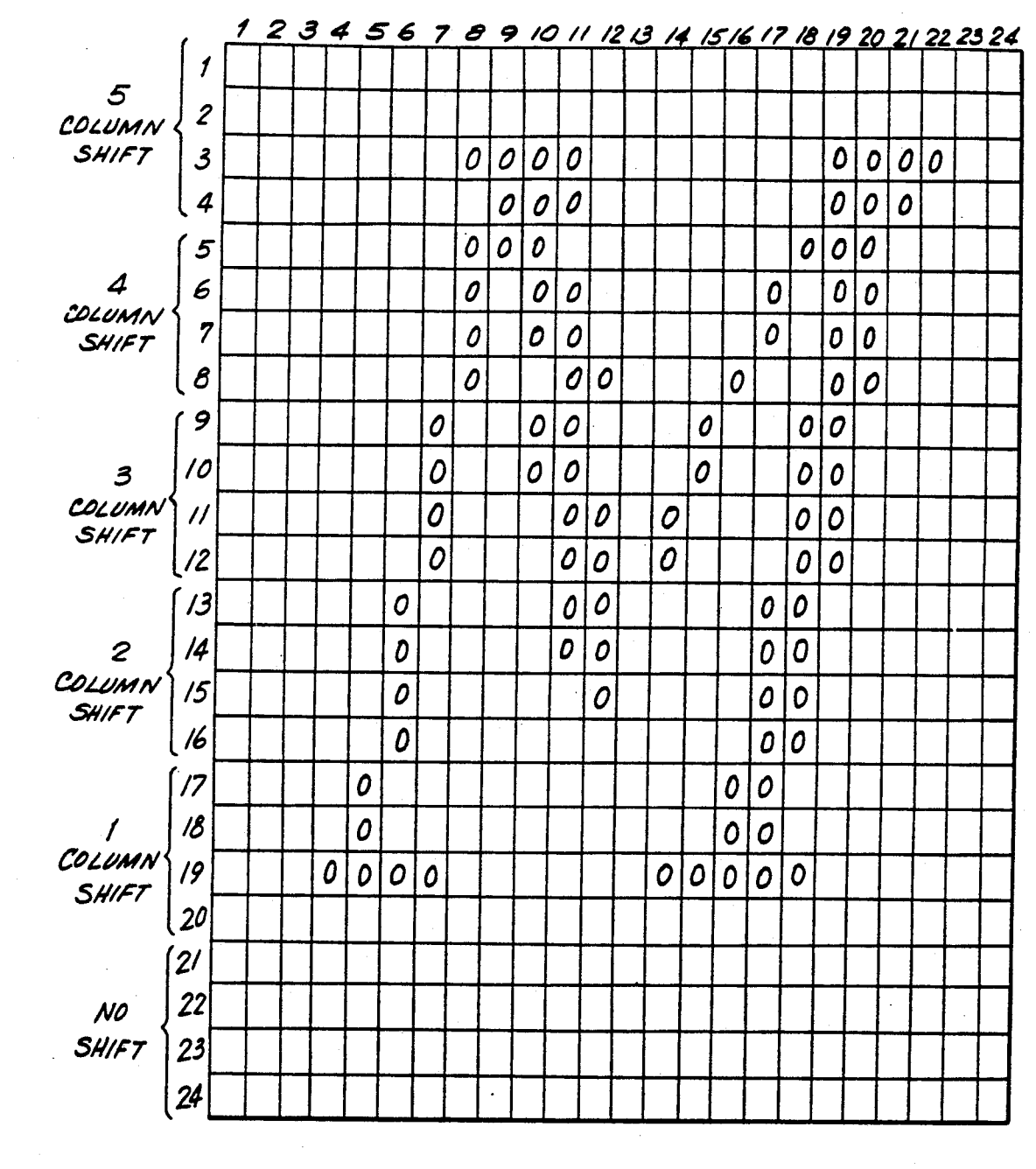

When a character has a font type different from that stored in character generator 31 (e.g. when the character needs to be altered by changing its type font to an italic form instead of a basic roman character pattern), microprocessor portion 1 controls the revision of the character pattern. Microprocessor portion 1, on the basis of the character modification instruction input from host device 25, performs a series of predetermined logical operations on the basic character pattern data stored, for example, in a roman type font form in buffer memory 32 to shift to an italic form. The arrangement of dots of the character pattern is shifted so that the upper side of the character is slanted toward the right and this modified dot pattern data is then stored in buffer memory 32. As seen in FIG. 9, the character (M) is converted to an italic font by shifting the data at pins 1-4 by 5 columns, the data at pins 5-8 by 4 columns, the data at pins 9-12 by 3 columns, the data at pins 13-16 by 2 columns and the data at pins 17-20 by a single column. The character pattern data which has been modified to an italic font type is then read out from buffer memory 32 to line memory 50 in the proper printing sequence for the pin arrangement of the print head of printer 40. This process is repeated with character pattern data being sequentially stored in line memory 50 until a sufficient number of stored character patterns to form an entire printed line are stored, or the print start code is input from the host device. When the storage process is completed, microprocessor portion 1 actuates printer 40 to print the characters formed by the dots on the paper as the data is read out in the order it is stored in line memory 50.

In the embodiment described above buffer memory 32 is an independent member. However, a part of the line memory storage area may be utilized equally effectively as the buffer memory.

Dot pattern correction may also occur by adjusting the dot pattern data representative of at least one character, which is output to line memory in the order in which it is to be printed, based on the configuration of the print head and the printer, i.e. arrange the dot pattern data stored in buffer memory responsive to the position of the print elements in the print head.

Figure 3:
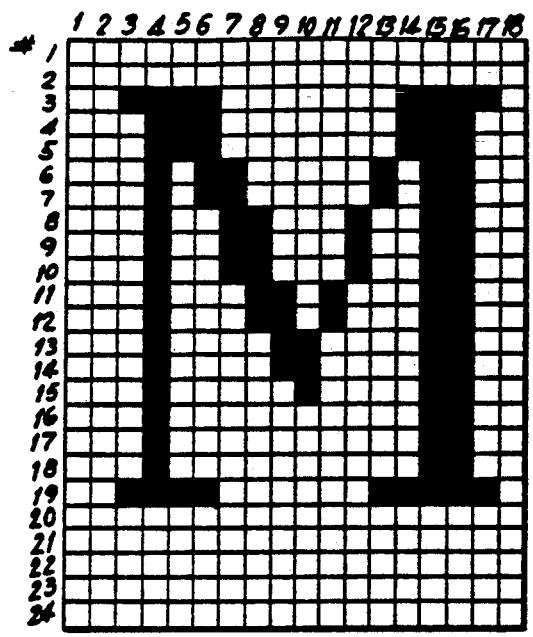
FIG. 3 depicts the print pattern of the character "M" in a 24×18 character grid.
Figures 4A, 4B:
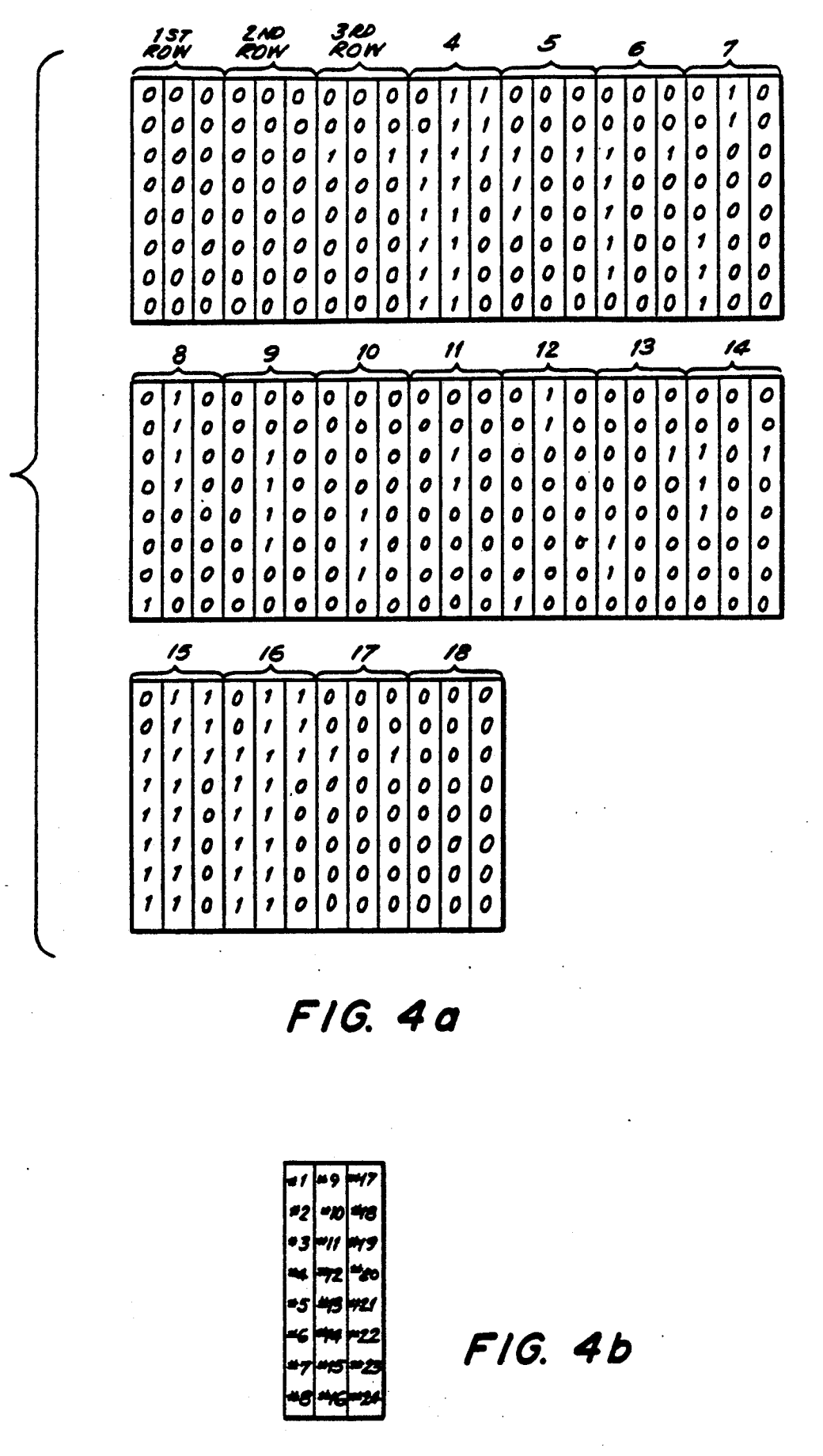

The manner in which a dot character pattern, composed of a matrix of 24 vertically aligned dots by 18 columns, is printed out, will be described with reference to the character "M" shown in FIG. 3. In this case, the character pattern for the "M" is stored in character generator 31 in the form of the data shown in FIG. 4A. The twenty-four vertically aligned dots of each column of the pattern in FIG. 3 may be, for example, constructed by three 8 bit data words as shown in FIG. 4B.

Figures 5, 6:
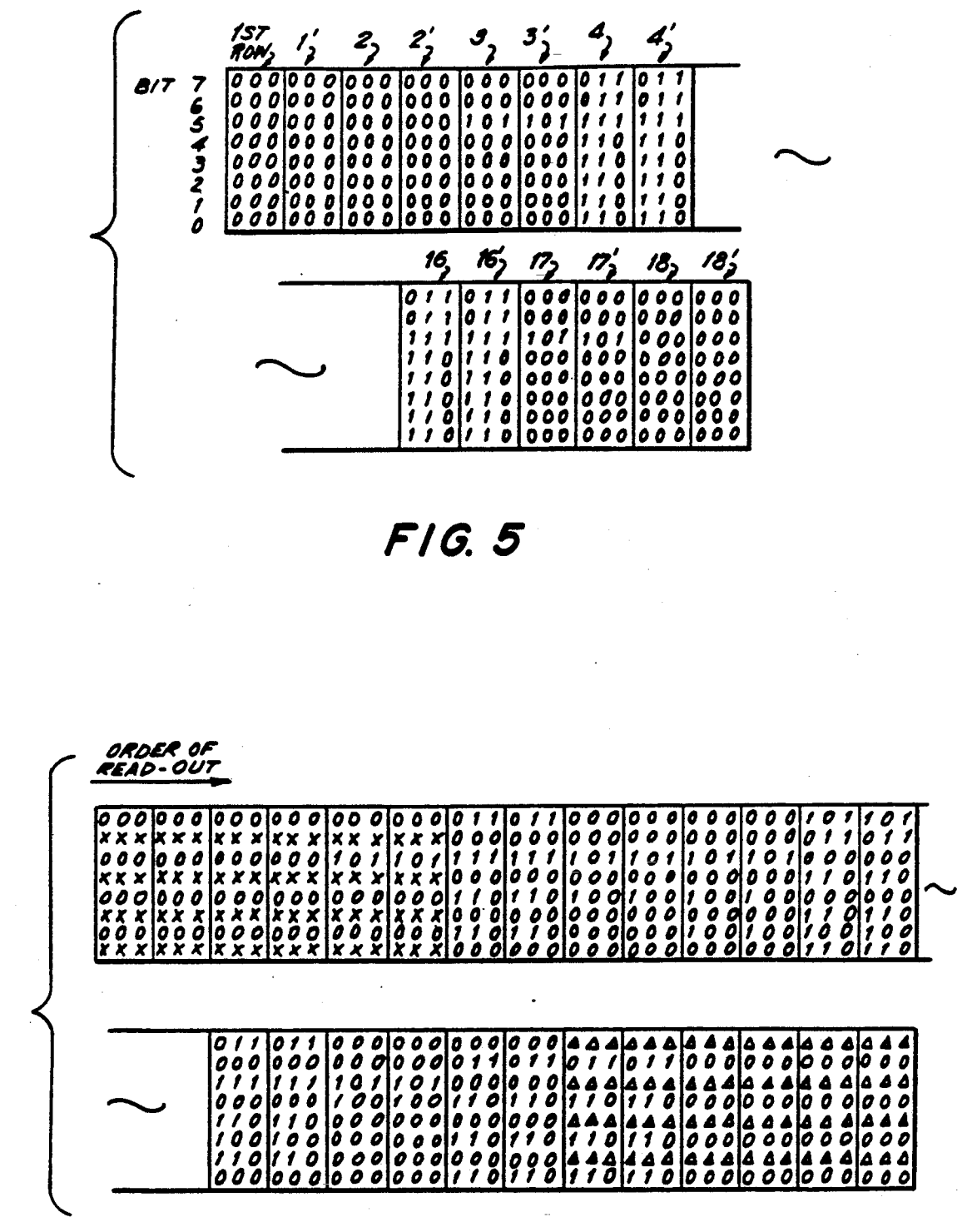

When the host device determines that the character should be a double-width character, the character pattern data is modified in buffer memory 32, the result of which is shown in FIG. 5. As is apparent from FIG. 5, every twenty-four bit data word (block), corresponding to the twenty-four vertically aligned dots in each column of the pattern, is duplicated so as to double the character width.

This modified character pattern, as shown in FIG. 5, is then rearranged to match the spatial pin arrangement of the print head with the order in which the print head will actually print the dots, and is then stored in line memory 50 in this sequence.

Figure 2A:
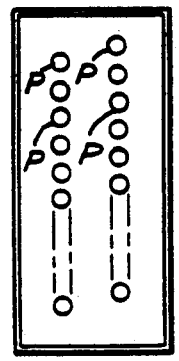
FIGS. 2A and 2B are pictorial representations of the pin arrangements of two print heads which can be utilized in connection with the character pattern generating apparatus constructed in accordance with the invention.

Reference is next made to FIG. 6 wherein the manner in which the character pin data shown in FIG. 5 is stored in line memory 50 is depicted. The line memory arrangement of FIG. 6 is based on a print head pin arrangement as shown in FIG. 2A, where twenty-four pins are arranged in two vertical rows, each having twelve pins. The twelve pins in the right column of the print head are numbered, from the top down, pin 1, pin 3, pin 5, pin 7, pin 9, pin 11, pin 13, pin 15, pin 17, pin 19, pin 21 and pin 23. The twelve pins in the left column of the print head are numbered, from the top down, pin 2, pin 4, pin 6, pin 8, pin 10, pin 12, pin 14, pin 16, pin 18, pin 20, pin 22 and pin 24. FIG. 6 shows the character pattern data arranged so that the twenty-four dots in each vertical column are divided, row by row into pin data for only one of the rows of twelve pins. For example the first, third, fifth and seventh rows of three bits of pin data are the dots which are printed by the right row of twelve pins. The second, fourth, sixth and eighth row of three bits of pin data represent the dots to be printed by the left column of twelve pins.

In the print head shown in FIG. 2A, for which the data in FIG. 6 is arranged, there is a physical distance of six dots between the left column of twelve pins and the right column of twelve pins. When printing data stored in a certain address in a memory is printed by the pins in the columns in the direction in which the carriage is moved, the printing data stored in the address adjacent the printing data stored in the certain address should not be read out or printed by the pins of the trailing column of pins. This is because the distance between the two columns of pins is larger than the distance represented by the distance between the print data address of the two columns. Additionally, as the pins are arranged in two columns, the print data is read out in a column by column manner.

Figure 10:
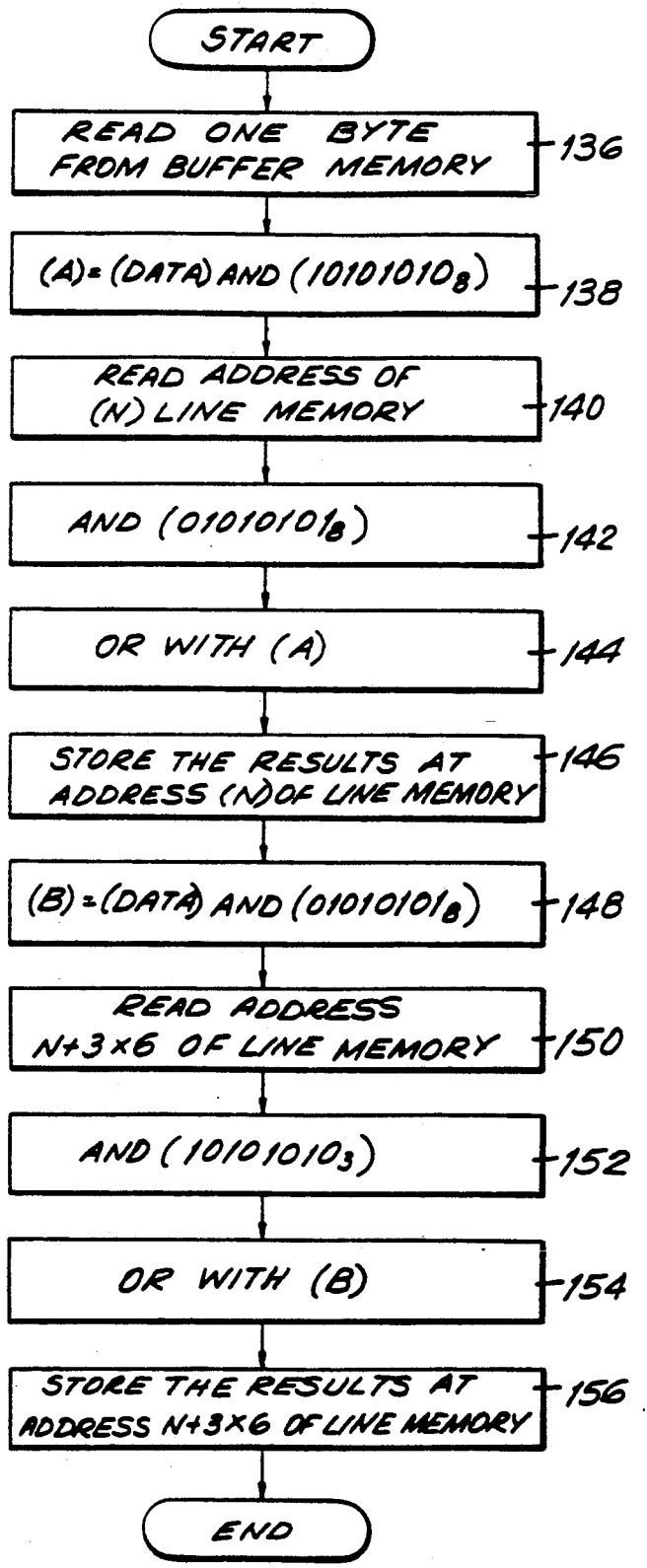
FIG. 10 is a flow chart showing the manner in which the data is transmitted from the buffer memory to the line memory in accordance with the invention.

As shown in FIG. 10, the dot arrangement is performed by reading (DATA) a single data byte at a time (D0, D1, D1 . . . D7) from buffer memory 32 in step 136. Because the pins are arranged to be staggered in two columns, the data (A) of the first column is determined by the product of DATA and a multiplier (1, 0, 1, 0, 1, 0, 1, 0) in a step 138 resulting in (DO, O, D2, 0, D4 . . . 0). The data (NO, N1, N2 . . . N7) stored at an address N of line memory 50 is then read from line memory 50 in accordance with a step 140 and multiplied by a multiplier (0, 1, 0, 1, 0, 1, 0, 1) resulting in a data set (0, N1, 0, N3, 0, N5, 0, N7). The result is combined with the values for A to form a new value of N or A in a step 144 resulting in (DO, N1, D2, N3, D4, N5, D6, N7). The results are stored at address N of line memory 50 in a step 146.

The process is then repeated for data B corresponding to the second column of print heads. The DATA is multiplied by staggered multiplier of (0, 1, 0, 1, 0, 1, 0, 1) in a step 148 which is the converse of the data multiplier for A. The data (N0', N1', N2' . . . N7') is then read out from address (N+3)×6 of line memory 50 in accordance with step 150 and combined with a multiplier (1, 0, 1, 0, 1, 0, 1, 0) in accordance with a step 152. The new value of B is then combined with the multiplied data from line memory 50 in a step 154. The results are then stored at the address (N+3)×6 of line memory 50 in a step 156.

Figure 2B:
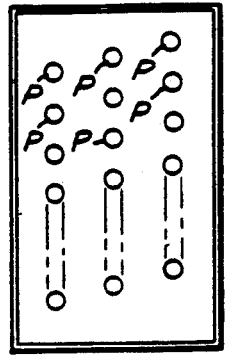
Figure 2C:
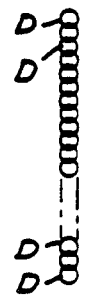
FIG. 2C is a pictorial representation of a column of overlapping dots which can be produced by the print heads of FIGS. 2A and 2B.

Data (A) is stored in address (N) and data (B) is stored in address ((N+3)×6). This is done because the printing data is stored in an address which is separated by a distance corresponding to the physical distance between the two columns to prevent printing slippage at the pins in the two columns perform printing operations at the same time. This is one example in which the address or data (A) is different from that of data (B) by 3×6, however, as a matter of course, the difference between the addresses can be changed in accordance with the distances between the columns of pins, printing dot density or other variables. An effective process is carried out if the binary data (10101010) and (01010101) are utilized. As a result, the dots to be printed by the left column of twelve dots on the print head must be delayed six dots from the corresponding pin data for the right column of twelve pins on the print head to properly align on the paper. Therefore, a comparison of FIGS. 5 and 6 shows that the first, third, fifth and seventh rows of data in FIG. 6 are identical to the corresponding rows of data in FIG. 5. However, the data in rows 2, 4, 6 and 8 of FIG. 5 are shifted six blocks to the right (a block being a grouping of twenty-four data bits 8 high by 3 wide) in FIG. 6. As a result of this arrangement, each character requires six blocks more than its character width in the line memory to be completely printed. The data indicated in FIG. 6 by an "X" or a "▲" is not necessary when only a single character is printed. However, where consecutive characters are printed, the "X" data bits represent the last six vertical rows of dots to be printed by the left twelve pin row of the print head of the immediately preceding character. Likewise, the "▲" data bits are used for the first six vertical rows of dots to be printed by the right row of twelve pins for the immediately following character. If only a single character is being printed, it is not necessary for these "X" and "▲" data bits to be filled in.

Where a series of characters are printed only six additional blocks of data are required, the six additional blocks for the last character. The intermediate characters require no extra blocks because of the "X" and "▲" characters. Where a different print head, such as that shown in FIG. 2B is used; a slightly different memory arrangement for line memory 50 is used. However, microprocessor 1 and character generator 30 can be programmed to adapt the character pattern bit data for a variety of print head pin arrangements.

Figure 7:
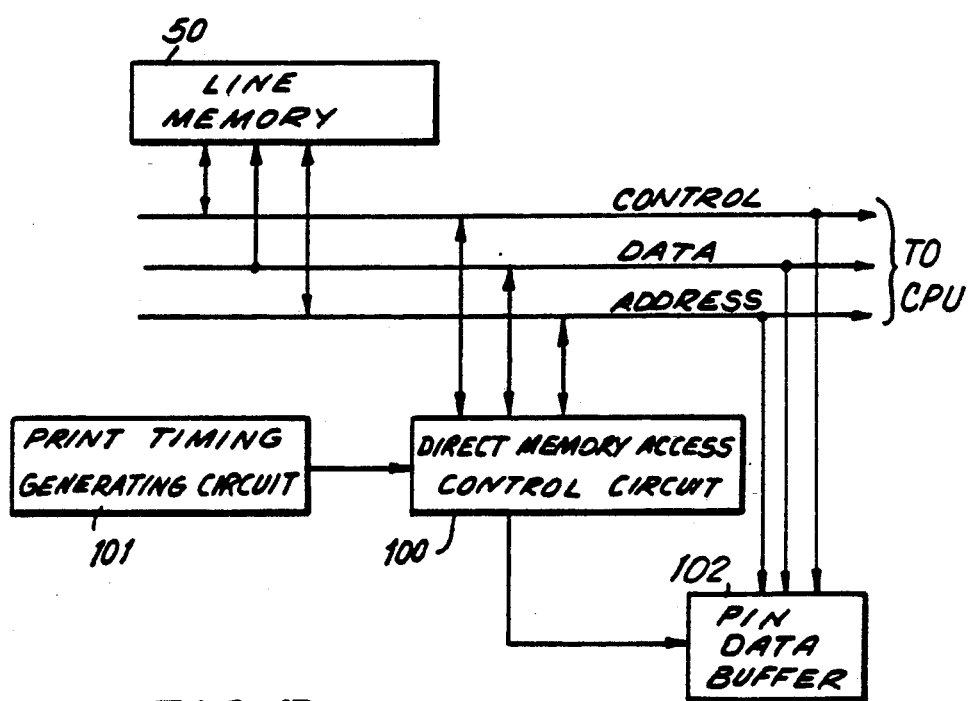
FIG. 7 is a functional block diagram showing the manner in which the characters are printed out in accordance with the invention.

Reference is next made to FIG. 7 wherein the manner in which printing is accomplished utilizing a Direct Memory Access (DMA) approach is depicted. When the pattern data is stored in line memory 50 in the state shown in FIG. 6, where the pattern is arranged corresponding to the pin arrangement of the printer head, a DMA control circuit 100 reads the data in line memory 50 out to a pin data buffer 102. Printing begins when the data for a twenty-four four pin vertical row is set in pin data buffer 102. The address in line memory 50, from which the data is read out, is set in DMA control circuit 100 by CPU 2. DMA control circuit 100 reads out the data under the control of a timing signal generated by a print timing generating circuit 101.

The arrangement shown in FIG. 7 utilizes a DMA control circuit 100 to read data out of line memory 50. However, the reading out of data from line memory 50 may be controlled entirely by CPU 2 instead of a separate DMA control circuit 100. The arrangement shown in FIG. 7 may also utilize a DMA control method where DMA control circuit 100 is designed to perform the process of FIG. 10.

The character pattern generating apparatus constructed in accordance with the invention temporarily stores dot pattern data output from the character generator in the buffer memory before it is read out to the line memory. As a result, it is possible to perform logical operations on the dot pattern data in the buffer memory to form the desired dot pattern, decreasing to a large extent the number of dot pattern data sets corresponding to different font types required in the character generator. Further, the dot pattern data in the buffer storage can be read out to the line memory in a manner which corresponds to the pin arrangement of the printer head. As a result, the operation of the line memory is simplified during printing, obviating the need to alter the contents of the line memory prior to printing. This has the effect of increasing the printing speed and simplifying the construction of the line memory. This also allows the dot pattern data stored in the character generator to be insensitive to the type of print heads used rather than the traditional approach of storing the dot pattern data in the rearranged format keyed to the pin arrangement of a particular print head. As a result, the character generator can be generalized for a variety of printers and print head pin arrangements. Accordingly, an improved character pattern generating apparatus for use with a dot matrix type serial printer, which can easily print out characters in different font types and for different printers with varying print head pin arrangements without a need for enormous storage requirements is provided.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A character pattern generator apparatus for use in a dot matrix type serial printer, the printer including a print head having print pins disposed therein comprising:

character patterns storage means for storing dot pattern data representative of characters corresponding to print codes;

buffer memory means coupled to the character patterns storage means for receiving dot pattern data corresponding to selected print codes read out from the character patterns storage means and storing the dot pattern data representative of at least one character;

line memory means for storing dot pattern data for a line to be printed in the line memory means by bits, the bits corresponding to the number of pins in the print head, said line memory means being operable independently of the dot pattern data corresponding to the selected print codes;

DMA controller means for transmitting the dot pattern data stored in the line memory means to the print head independently of the process performed in the buffer memory means;

dot pattern correction means coupled between the character pattern storage means and the line memory means for at least one of changing the dot pattern data representative of at least one character and for outputting the dot pattern data to the line memory means in the order in which it is to be printed, the buffer memory means being coupled between the character pattern storage means and the line memory means, and said dot pattern correction means including a CPU for controlling operation thereof.

2. The character pattern generating apparatus of claim 1 further comprising font type adjustment means coupled to the buffer memory means for changing the font type of a character output from the character pattern storage means to the buffer memory means from a first font type, stored in the character pattern storage means to a second font type.

3. The character pattern generating apparatus of claim 2 wherein the font type adjustment means changes the dot pattern data of the character stored in the data buffer means to dot pattern data of the second font type.

4. The character pattern generating apparatus of claim 1 further comprising line memory means for storing dot pattern data for a line to be printed, and print head adjustment means coupled between the buffer memory means and the line memory means for outputting the dot pattern data stored in the buffer memory means to the line memory means in the order in which it is to be printed.

5. The character pattern generating apparatus of claim 1 wherein the printer has a print head with at least two rows of pins further comprising line memory means for storing dot pattern data for a line to be printed, and print head adjustment means coupled between the buffer memory means and the line memory means for outputting the dot pattern data stored in the buffer memory means to the line memory means in the order in which it is to be printed.

6. The character pattern generating apparatus of claim 5 wherein the print head adjustment means stores the print data in the line memory means in the appropriate order by moving the print data supplied to the first row of pins in the print head relative to the print data supplied to the second row of pins of the print head, an amount corresponding to the physical distance between the first and second rows, so that the print data for the first row of pins is printed in alignment with the print data for the second row of pins.

7. The character pattern generating apparatus of claim 5 wherein the print head adjustment means stores the print data in the line memory means in the appropriate order by moving the print data supplied to the first row of pins in the print head relative to the print data supplied to the second row of the pins of the print head an amount corresponding to the physical distance between the first and second rows so that the data for the first row of pins is printed before the print data for the second row of pins.

8. A character pattern generating apparatus for use in a dot matrix type serial printer having a printer having a print head with a plurality of print elements, said character pattern generating apparatus comprising:

character pattern storage means for storing dot pattern data representative of characters corresponding to print codes;

buffer memory means, coupled to the character pattern storage means for receiving dot pattern data corresponding to selected print codes read out from the character pattern storage means and storing the dot pattern data representative of at least one character;

line memory means for storing the dot pattern data for a line of data to be printed by bits, the bits corresponding to the number of print elements in the print head, the line memory means being operable independently of the data corresponding to the selected print codes;

DMA controller means for transmitting the dot pattern data stored in the line memory means to the print head independently of the process performed in the buffer memory means;

print head adjustment means coupled between the buffer memory means and the line memory means for arranging the dot pattern data stored in the buffer memory means responsive to the position of the print elements in the print head and storing the arranged dot pattern data in the line memory, whereby the sequential printing of data from the line memory means correctly prints the characters corresponding to the selected print codes, the buffer memory means being coupled between the character pattern means and the line memory means, and said print head adjustment means including a CPU for controlling operation thereof.

9. The character pattern generating apparatus of claim 8 wherein the print head has at least two rows of print elements and the print head adjustment means stores the print data in the line memory means in the appropriate order by moving the print data supplied to the first row of print elements in the print head relative to the print data supplied to the second row of print elements of the print head an amount corresponding to the physical distance between the first and second rows, so that the print data for the first row of print elements is printed in alignment with the print data for the second row of print elements.

10. The character pattern generating apparatus of claim 8 wherein the print head has at least two rows of print elements and the print head adjustment means stores the print data in the line memory means in the appropriate order by moving the print data supplied to the first row of print elements in the print head relative to the print data supply to the second row of print elements of the print head an amount corresponding to the physical distance between the first and second rows, so that the print data for the first row of print element is printed before the print data for the second row of print elements.

11. The character pattern generating apparatus of claim 8 further comprising font type adjustment means coupled to the buffer memory means for changing the font type of a character from the character pattern storage means to the buffer output means from a first font type, stored in the character pattern storage means, to a second font type.

12. The character pattern generating apparatus of claim 11 wherein the font type adjustment means changes the dot pattern data of the character stored in the data buffer means to dot pattern data of the second font type.

13. The character pattern generating apparatus of claim 11 wherein the first font type is a roman font and the second font type is an italic font type.

14. The character pattern generating apparatus of claim 9 further comprising font type adjustment means coupled to the buffer memory means for changing the font type of a character output from the character pattern storage means to the buffer means from a first font type, stored in the character pattern storage means, to a second font type.

15. A character pattern generating apparatus for use in a dot matrix type serial printer, the printer including a print head having print pins disposed therein, comprising:
   character pattern storage means for storing dot pattern data representative of characters corresponding to print codes;
   buffer memory means coupled to the character pattern storage means for receiving dot pattern data corresponding to selected print codes read out from the character pattern storage means and storing the dot pattern data representative of at least one character;
   line memory means for storing the pattern data for a line to be printed, by bits, the bits corresponding to the number of pins in the print head, the line memory means being operable independently of the data corresponding to the selected print codes;
   DMA controller means for transmitting the dot pattern data stored in the line memory means to the print head independently of the process performed in the buffer memory means; and
   font type adjustment means coupled to the buffer memory means for changing the font type of a character output from the character pattern storage means to the buffer memory means from a first font type, stored in the character pattern storage means, to a second font type, not stored in the character pattern storage means, and said font type adjustment means including a CPU for controlling operation thereof.

16. The character pattern generating apparatus of claim 15 wherein the font type adjustment means changes the dot pattern data of each character stored in the data buffer means to dot pattern data of the second font type.

17. The character pattern generating apparatus of claim 15 further comprising line memory means for storing dot pattern data for a line to be printed, and print head adjustment means coupled between the buffer memory means and the line memory means for outputting the dot pattern data stored in the buffer memory means to the line memory means in the order in which it is to be printed.

18. The character pattern generating apparatus of claim 15 wherein the print head has at least two rows of print elements, further comprising line memory means for storing dot pattern data for a line to be printed, and print head adjustment means coupled between the buffer memory means and the line memory means for outputting the dot pattern data stored in the buffer memory means to the line memory means in the order in which it is to be printed.

19. The character pattern generating apparatus of claim 18 wherein the print head adjustment means stores the print data in the line memory means in the appropriate order by moving the print data supplied to the first row of print elements in the print head relative to the print data supplied to the second row of print elements of the print head, an amount corresponding to the physical distance between the first and second rows of print elements, so that the print data for the first row of print elements is printed in alignment with the print data for the second row of print elements.

20. The character pattern generating apparatus of claim 18 wherein the print head adjustment means stores the print data in the line memory means in the appropriate order by moving the print data supplied to the first row of print elements in the print head relative to the print data supplied to the second row of the pins of the print head an amount corresponding to the physical distance between the first and second rows so that the data for the first row of print elements is printed before the print data for the second row of print elements.

* * * * *